(12) United States Patent
Osterkamp et al.

(10) Patent No.: US 12,056,705 B1
(45) Date of Patent: *Aug. 6, 2024

(54) TOUCHLESS AUTHENTICATION METHOD AND SYSTEM

(71) Applicant: UIPCO, LLC, San Antonio, TX (US)

(72) Inventors: Bryan J. Osterkamp, New Braunfels, TX (US); Will Kerns Maney, Jr., San Antonio, TX (US); Andre Rene Buentello, San Antonio, TX (US); Mark Paxman Warnick, San Antonio, TX (US); Jose L. Romero, Jr., San Antonio, TX (US); Oscar Roberto Tijerina, San Antonio, TX (US); Sean Carl Mitchem, San Antonio, TX (US); Timothy Blair Chalmers, San Antonio, TX (US); Ruthie D. Lyle, Durham, NC (US); Mitzi Ruiz, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,245

(22) Filed: Feb. 3, 2023

Related U.S. Application Data

(63) Continuation of application No. 17/104,431, filed on Nov. 25, 2020, now Pat. No. 11,610,204.

(60) Provisional application No. 62/941,227, filed on Nov. 27, 2019.

(51) Int. Cl.
G06Q 20/40 (2012.01)
G06F 21/32 (2013.01)
G06Q 20/38 (2012.01)

(52) U.S. Cl.
CPC ....... *G06Q 20/40145* (2013.01); *G06F 21/32* (2013.01); *G06Q 20/3821* (2013.01); *G06Q 20/40155* (2020.05)

(58) Field of Classification Search
None
See application file for complete search history.

(56) References Cited

U.S. PATENT DOCUMENTS

2019/0164165 A1* 5/2019 Ithabathula ............. G06F 21/34

* cited by examiner

*Primary Examiner* — Scott S Trotter
*Assistant Examiner* — Amit Patel
(74) *Attorney, Agent, or Firm* — Plumsea Law Group, LLC

(57) ABSTRACT

A touchless method and system of performing an authentication of a person in order to permit access to a secured resource is disclosed. The system and method are configured to collect channel state information associated with a person as they pass through a sensor zone and identify a biometric signal for the person. The system detects whether there is a match between the biometric signal and any biometric signals previously collected and stored in a database. If there is a match, the system verifies an identity of the person and can be configured to automatically grant the person access to one or more services, features, or locations for which he or she is authorized based on the authentication.

20 Claims, 12 Drawing Sheets

TOUCHLESS AUTHENTICATION METHOD AND SYSTEM

CROSS-REFERENCE TO RELATED APPLICATION

This application is a Continuation of Osterkamp et al., U.S. Pat. No. 11,610,204, issued on Mar. 21, 2023, and titled "Touchless Authentication Method and System," which claimed the benefit of U.S. Provisional Patent Application Ser. No. 62/941,227 filed on Nov. 27, 2019 and titled "Touchless Authentication Method and System." The disclosures of which are incorporated by reference in their entirety.

TECHNICAL FIELD

The present disclosure generally relates to the touchless authentication of persons, and specifically to a method and system for authentication and authorization of persons for granting access to one or more secured services, features, and resources based on a Wi-Fi-based signal associated with the person.

BACKGROUND

Organizations may provide authorized end-users with various secured services or resources via multiple communication channels. Examples of such channels include modes of communication (e.g., a communications network) for exchanging data between devices, where such devices may include, but are not limited to, computing devices, such as tablets, personal computers, and smartphones; point of sale devices; ATMs; connected smart devices, such as refrigerators, watches, and laptops; telephones, such as landline telephones or mobile phones; electronically locked spaces managed by computer user interfaces, such as safe deposit box chambers, lockers, cars, offices, homes; and face-to-face contacts, such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

In most scenarios in which an end-user attempts to access a secured resource via one or more of these channels, the end-user will be required to provide some proof of identity, typically associated with an identification card, key-card, fingerprint, or other factor before access is granted. Authentication (i.e., identifying and verifying) of an end-user can be time-consuming for both the end-user and the organization, as well as burdensome for users who are required to carry and present the necessary identification credentials and/or keys, or memorization of passwords or codes. It may be appreciated that many businesses and other organizations would benefit from mechanisms by which to reduce the costs associated with the authentication and authorization of customers. Furthermore, customers will be attracted by an authentication system that reduces or even eliminates the need to carry or offer unique identification factors.

There is a need in the art for a system and method that addresses the shortcomings discussed above.

SUMMARY

In one aspect, a method of authenticating an identity of an individual is disclosed. The method includes obtaining a first biometric signal at a first time, where the first biometric signal includes channel state information (CSI) for a first pair of Wi-Fi-enabled devices while a first person was physically in a sensor range of the first pair of Wi-Fi-enabled devices. The method also includes accessing a plurality of records stored in a database, where each record of the plurality of records includes a biometric signal linked to a unique user identity, as well as determining that the first biometric signal matches a second biometric signal of a first record of the plurality of records. The second biometric signal is linked to a first user identity. The method further includes determining, in response to the first biometric signal matching the second biometric signal, that the first person has the first user identity, and authenticating the first person for access to a secured resource.

In another aspect, a system for authenticating an identity of an individual includes a processor and machine-readable media. The machine-readable media include instructions which, when executed by the processor, cause the processor to obtain a first biometric signal at a first time, where the first biometric signal includes channel state information (CSI) for a first pair of Wi-Fi-enabled devices while a first person was physically in a sensor range of the first pair of Wi-Fi-enabled devices. The instructions also cause the processor to access a plurality of records stored in a database, where each record of the plurality of records includes a biometric signal linked to a unique user identity, as well as determine that the first biometric signal matches a second biometric signal of a first record of the plurality of records, the second biometric signal being linked to a first user identity. In addition, the instructions cause the processor to determine, in response to the first biometric signal matching the second biometric signal, that the first person has the first user identity, and to authenticate the first person for access to a secured resource.

In another aspect, a system for authenticating an identity of an individual includes means for obtaining a first biometric signal at a first time, where the first biometric signal includes channel state information (CSI) for a first pair of Wi-Fi-enabled devices while a first person was physically in a sensor range of the first pair of Wi-Fi-enabled devices. The system also includes means for accessing a plurality of records stored in a database, where each record of the plurality of records includes a biometric signal linked to a unique user identity, and means for determining that the first biometric signal matches a second biometric signal of a first record of the plurality of records, the second biometric signal being linked to a first user identity. The system further includes means for determining, in response to the first biometric signal matching the second biometric signal, that the first person has the first user identity, and means for authenticating the first person for access to a secured resource.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
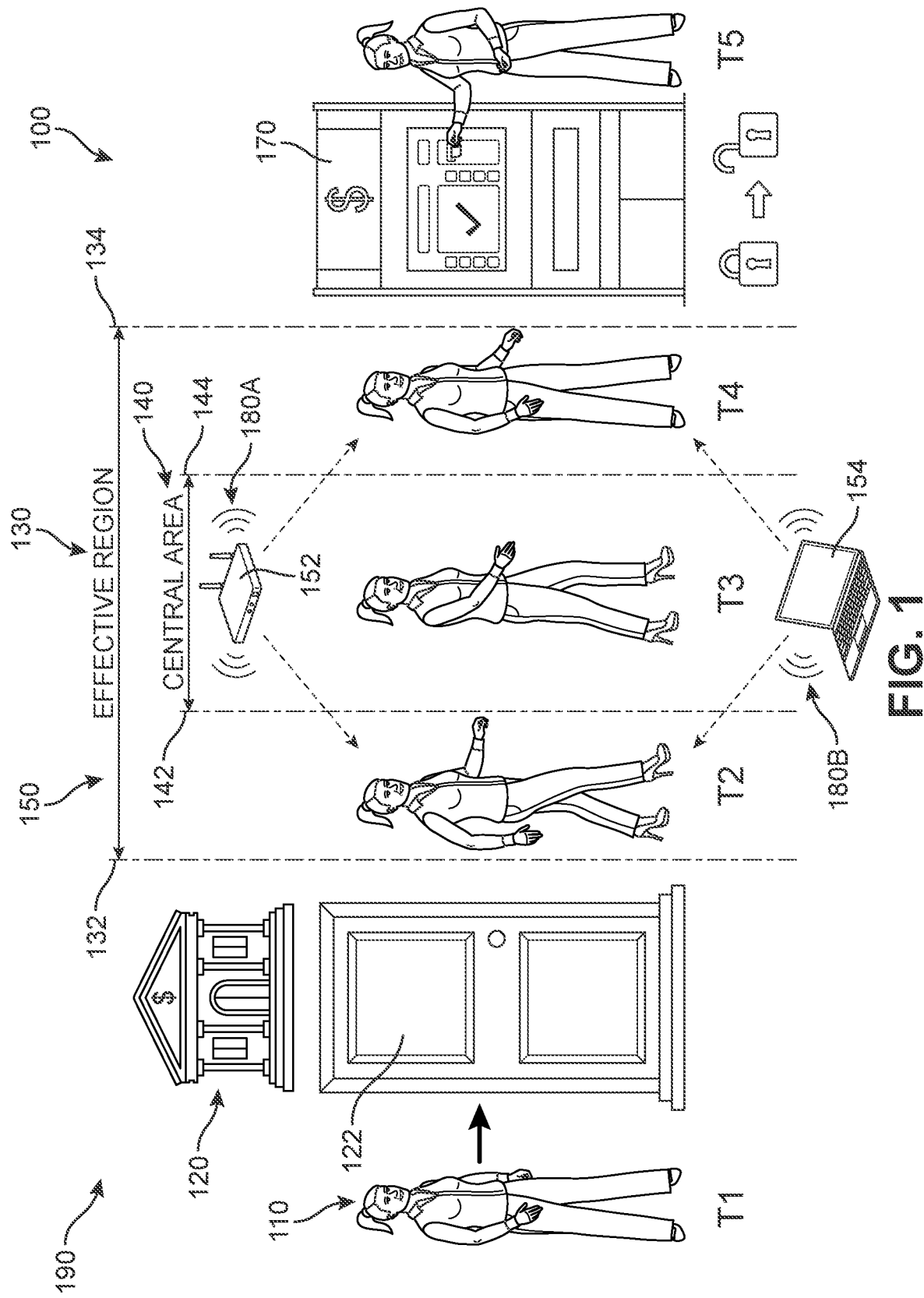
FIG. 1 is an overview of a scenario in which a person enters an authentication sensor zone and obtains access to a secured resource, according to an embodiment.

The embodiments provide a method and system for allowing users to be authenticated in a more secure and more efficient manner. As described in greater detail below, a touchless and passive authentication process and system may be utilized for reducing and in some cases eliminating the need for users to present credentials, input passwords, or otherwise offer identity tokens or factors. The proposed system takes advantage of the growing presence and availability of wireless devices in the day-to-day life of the modern consumer, and which have become nearly ubiquitous in most urban spaces. Such devices generate a spectrum of Radio Frequency (RF) signals even as they provide wireless network connectivity (e.g., IEEE 802.11x and other Wi-Fi technologies). As a person walks through spaces equipped with wireless devices, they create perturbations in these RF-based fields. Specifically, the Channel State Information (CSI) associated with these perturbations for each individual can be used to uniquely identify individuals. This automated touchless system takes advantage of signals already present or expected in most urban infrastructures to provide a powerful alternative to traditional authentication methods that have relied on cameras, microphones, physical objects (swipe cards, wearable tokens) or even more intrusive biometric scans. As will be discussed below, the proposed systems can further be configured to verify a user's identity with minimal user effort and offer a simplified, efficient, and ultimately highly convenient process by which to authorize and grant the user access to secured resources. Such systems can rely on the infrastructure that is already in place for wireless communication in many spaces, making it simple to deploy at a low cost. Moreover, unlike sensor-based and video-based solutions, such a Wi-Fi sensing and authentication system is not intrusive nor is it sensitive to lighting conditions.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. Security systems use this identity when determining if a subject can access an object. In addition, the term authentication refers to the process of proving (or verifying) an identity, and typically occurs when subjects provide appropriate credentials to prove their identity. For example, when a user provides the correct password with a username, the password proves that the user is the owner of the username. Thus, the authentication provides proof of a claimed identity. As a general matter, three main methods of authentication include (a) user knowledge, such as a password or PIN; (b) user possession, such as a key, smart card, CAC (Common Access Card), PIV card (Personal Identity Verification card), RSA, or other card or token, magnetic stripe cards, certificates with a digital signature, etc.; and (c) biometric factors, such as voice recognition, retinal and fingerprint scans, etc.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "touchless" refers to the concept of a system and method that is not dependent on contact from a person or presentation of tangible (physical) factors. Similarly, the term "passive" refers to the concept of a system and method that is not dependent on any particular 'active' interaction of a person with a device resulting from a change in the person's normal activity or behavior. In other words, walking and moving from one location to another are passive interactions, as the person would perform these activities regardless of the authentication system that is in place. However, other user actions, such as but not limited to providing a voice command, passcode, retinal scan, carrying and presenting an identification credential or token, fingerprint scan, etc. are active inputs and a system requiring any of these types of information would not be considered passive.

References to Wi-Fi networks describe networks that have no physical wired connection between the sender and receiver by use of RF technology (a frequency within the electromagnetic spectrum associated with radio wave propagation). When an RF current is supplied to an antenna, an electromagnetic field is created that then is able to propagate through space. Generally, wireless networks will require an access point (AP), which is configured to broadcast a wireless signal that Wi-Fi enabled computing devices can detect and "tune" into. In order to connect to an access point and join a wireless network, computers and devices must be equipped with wireless network adapters. For purposes of this application, the use of the term "Wi-Fi" refers to the generic use of the Wi-Fi term which includes any type of network or WLAN product based on any of the 802.11 standards, including but not limited to 802.11b, 802.11a, 802.11g, 802.11n, dual-band, etc. Furthermore, use of the term "Wi-Fi enabled" refers to devices or products that are configured as "Wi-Fi Certified" (a registered trademark) as interoperable with one another, even if they are from different manufacturers, or are otherwise able to receive and/or detect Wi-Fi signals.

It may be appreciated that conventional methods of authentication rely heavily on identification documents or other tangible items that users are required to carry on their person and present when prompted. However, physical tokens have significant shortcomings. For example, they can be lost, stolen, or forged. In many cases, an individual may need to carry multiple identification cards or tokens, which may be unwieldy. Furthermore, less tangible factors can be burdensome, requiring memorization or physical contact or a particular physical position or proximity with a device. The following systems describe a process of authentication that does not rely on tangible factors or changes in behavior by a user.

For purposes of clarity, an overview of one embodiment of the proposed systems and methods is illustrated with reference to FIG. 1. In FIG. 1, an example of an environment 190 designed with the goal of reliably authenticating a person is depicted. The environment 190 is arranged such that a person can automatically obtain access to secured resources to which they have been granted authorization. In this example, an access management system ("system") 100 is configured to touchlessly and passively verify an identify of a person so as to either permit or deny access to the user-identity dependent services provided by an ATM 170 located in facility 120.

In FIG. 1, a sequence is shown in which the first user 110 is represented as moving across or through a physical space over a span of time. It can be seen that first user 110 initially (at first time T1) is about to enter the facility 120 (here, a bank). After passing through a main door or entrance 122, the first user 110 enters a touchless authentication sensor zone ("sensor zone") 150 at a second time T2. For purposes of reference, the sensor zone 150 in FIG. 1 includes an effective region 130 (extending between a first end 132 and a second end 134) as well as a central area 140 (extending between a third end 142 and a fourth end 144), where the central area 140 is located within the effective region 130. The sensor zone 150 is generated, formed, or otherwise maintained by a pair of Wi-Fi enabled devices that include a first device 152 and a second device 154. In this case, the first device 152 is a transmitter node (Tx) that can comprise a typical Wi-Fi access point (AP) and is configured to continuously send packets 180a to a receiver node (Rx), represented here by second device 154 (e.g., laptop or other computing device), which passively records CSI-based data 180b from the received packets.

As a general matter, CSI captures the aggregate impact of multi-path, shadowing, and interference on the Wi-Fi signals in a given environment. CSI represents how wireless signals propagate from the transmitter to the receiver at certain carrier frequencies along multiple paths. Thus, a time series of CSI measurements captures how wireless signals travel through surrounding objects and humans in time, frequency, and spatial domains. For example, CSI amplitude variations in the time domain have different patterns for different humans, activities, gestures, etc., which can be used for human presence detection, as well as motion, activity, and gesture recognition, and identification.

In the absence of people moving through the sensor zone 150, the CSI data will capture the effect of the ambient noise from other RF transmissions in the vicinity. However, as first user 110 walks into facility 120, her gait impacts the environment 190 in a unique manner, particularly within sensor zone 150. In other words, the presence of first user 110 affects the Wi-Fi signal, and is manifested by unique perturbations in the CSI data. This may be understood to result from the wide diversity of biometric characteristics for each person, such as but not limited to height, weight, bone, and/or fat rates. Those characteristics incur distinct affections on Wi-Fi signals reflected from a person. Thus, the human body can be analogized as an object with geometrically irregular reflections and varying materials, yielding distinct absorption and reflection effects on the Wi-Fi signals. In other words, a human's body components, such as tissues, entrails, and organs, have different absorption effects on Wi-Fi.

While the first user 110 passes first end 132 and enters the effective region 130, she enters the physical space in which her motion will have a greater impact on the Wi-Fi spectrum. When the first user 110 passes third end 142 and enters the central area 140 at a third time T3, she is directly crossing the line of sight (LoS) path between the transmitter (first device 152) and the receiver (second device 154), and the impact of her motion will be the most pronounced on the CSI data. The data collected at this time will be most relevant to the feature extraction that will be used to generate her substantially unique biometric signal by the system. The first user 110 then continues walking forward, passes the fourth end 144 and exits the central area 140 at a fourth time T4, continuing to cause perturbations in the CSI data. Finally, at a fifth time T5, the first user 110 passes the second end 132 and exits the effective region 130 of sensor zone 150. The system 100 processes the CSI data (e.g., see FIGS. 2 and 3) and a set of features are extracted that will be matched with feature sets that had been previously captured and stored in a database. Once a match is detected, the user's identity will be verified. In this example, the first user 110 has been authenticated by fifth time T5, and the system 100 automatically communicates such authentication to ATM 170, which determines—based on account information for the first user 110—that first user 110 is authorized to access her banking information and/or services at ATM 170. Thus, in FIG. 1, without further action or presentation of credentials by first user 110, the ATM 170 automatically logs into the account linked to the authenticated identity of the first user 110. The first user 110 is then able to request and receive cash or deposit money, or access other account services through the ATM.

While in some embodiments the system 100 may incorporate additional layers of authentication that may supplement the authentication process associated with the sensor zone 150, such as facial recognition, voice recognition, fingerprint recognition, password or pin-code verification, token-detection, or other such factors, it may be appreciated that the system 100 can be readily implemented without such additional steps. In other words, the first user 110 is able to obtain access to the desired secured resources without an identification card, debit card, or other token typically presented at such interfaces. The system 100 thereby allows the user to be passively (e.g., touchlessly) authenticated. In some embodiments, the system 100 is further configured to automatically provide the user with access to the secured service linked to the user's unique account, in response to the authentication that is performed based only or primarily on the data generated by the user's passage through the sensor zone 150.

Figure 2:
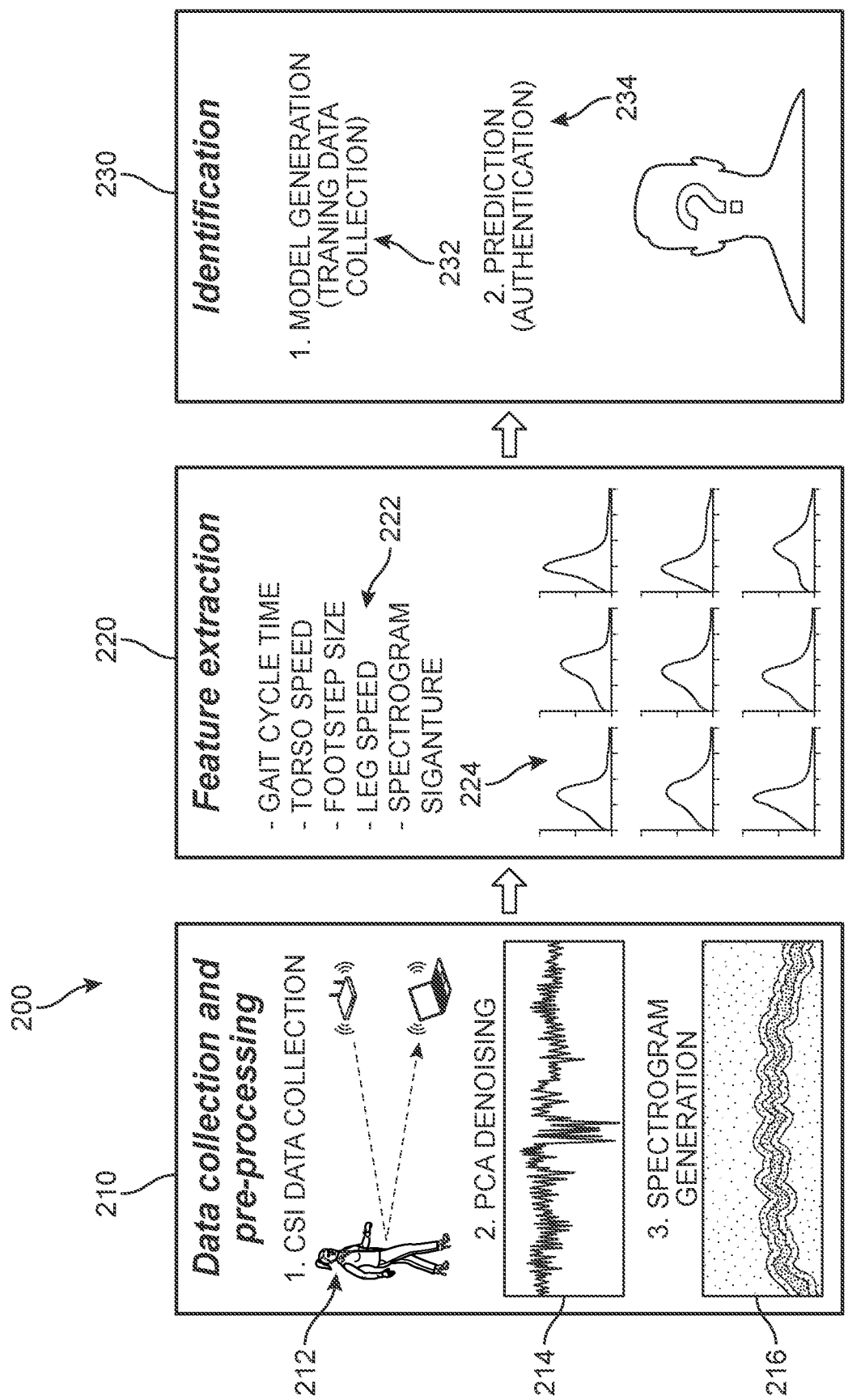
FIG. 2 is an overview of an architecture of a Wi-Fi-based authentication system, according to an embodiment.

For purposes of clarity, an overview of a system architecture ("architecture") 200 for support of some of the proposed systems is depicted in FIG. 2. The architecture 200 includes three general stages, including a first stage 210 ("data collection and pre-processing"), a second stage 220 ("feature extraction"), and a third stage 230 ("identification"). It should be understood that the architecture 200 as presented is for purposes of illustration only, and other embodiments may utilize different or additional processes and steps, a different ordering of these steps, or omit one or more steps shown.

As noted earlier, the human body reflects wireless signals, generating unique variations in CSI data that includes a vast amount of information about environmental changes occurring in the sensor zone and allowing two or more Wi-Fi enabled devices can act as 'Doppler Radars' to measure human activities. During first stage 210, a first step 212 is directed to the collection of CSI data. In a second step 214, denoising techniques (such as Principal Component Analysis (PCA)) is applied to extract the principal components from the correlated CSI measurements, so that the uncorrelated noises in different subcarriers are reduced. At a third step 216, the PCA components may be converted into spectrograms (for example, by use of Short Time Fourier Transform (STFT)). In some embodiments, frequency domain denoising algorithms (such as noise floor subtraction, spectrogram superimposition, and 2-dimensional filtering) can be used to further enhance the spectrogram.

In different embodiments, features are extracted from the spectrograms at a fourth step 222 that best characterize the movement, motion, gait, or walking pattern of a person during second stage 220. Such features can reflect walking speed, gait cycle time, footstep length, movement speeds of torso and legs, and spectrogram signatures. The distribution of reflected energy on predetermined frequency points can be used to serve as "signatures" 224 of the spectrogram, which are understood to indicate how different body parts are moving at a given stage of walking (thereby capturing the detailed walking patterns of a human subject). In other words, the energy distribution can serve as the "signature" or "fingerprint" for a human gait or physical body pattern, offering what will be referred to herein as a biometric signal that can be associated or linked to an individual human and serve as a touchless and passively collected reliable authentication factor. The biometric signal is determined primarily by the gait patterns and other complex factors such as the height and size of the person. Each biometric signal can be stored in a database and represent or be included in an authentication record that will be linked to the account of the person (including identification data) who participated in the training session, and be made available for use by the system during subsequent authentication sessions.

During the third stage 230, at a fifth step 232, one or more models may be generated based on the training data that has been collected. At a sixth step 234 a person associated with an authentication record may return at a subsequent time and CSI data collected for said person may be used to predict whether there exists a record in the database with a matching biometric signal above a specific confidence threshold and that can be used to authenticate an identity of the person.

Figure 3:
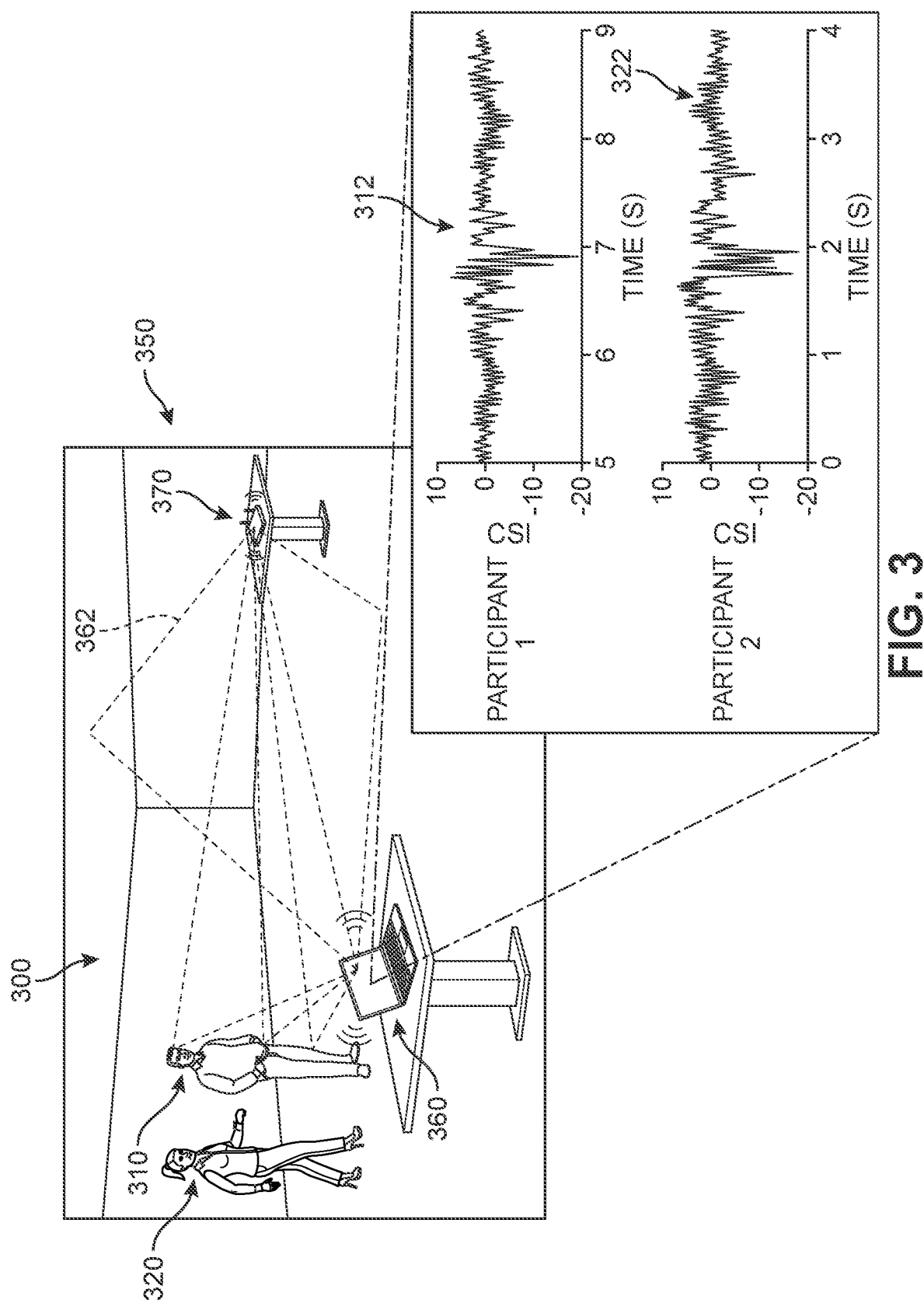
FIG. 3 is an example of a training session of a Wi-Fi-based authentication system, according to an embodiment.

Referring now to FIG. 3, an example of an enrollment or training and record acquisition session ("training session") 350 for collection of data and generation of biometric signals that may be used by some of the proposed systems is depicted. The training session 350 can, in some embodiments, be used to collect data and identify features that are unique to an individual and will then be stored in a database. In this case, two individuals are shown in an environment or space 300 that has been arranged to mimic or is the same location and device setup as will be used during subsequent authentication sessions. While the CSI data is tolerant to variances in spatial location and training can therefore occur in many different environments, the training session preferably occurs in the same location and utilizes the same device arrangement as will be used for authentication.

In FIG. 3, a first participant 310 is beginning to enter the effective region of a sensor zone produced by a plurality of signal reflections 362 generated by a first device 370 (Tx) and a second device 360 (Rx). Once the first participant 310 passes through the effective region during a first time period (in this case, between 0 and 4 seconds), a second participant 320 may also move through the effective region during a second time period (in this case, between 5 and 9 seconds). For each participant, CSI data is collected, as represented by a first graph 312 for first participant 310 and a second graph 322 for second participant 320. It can be observed that the CSI data for each participant includes distinct features that are unique for the participant. This information will be used to generate unique biometric signals for each of first participant 310 and second participant 320.

Figure 4:
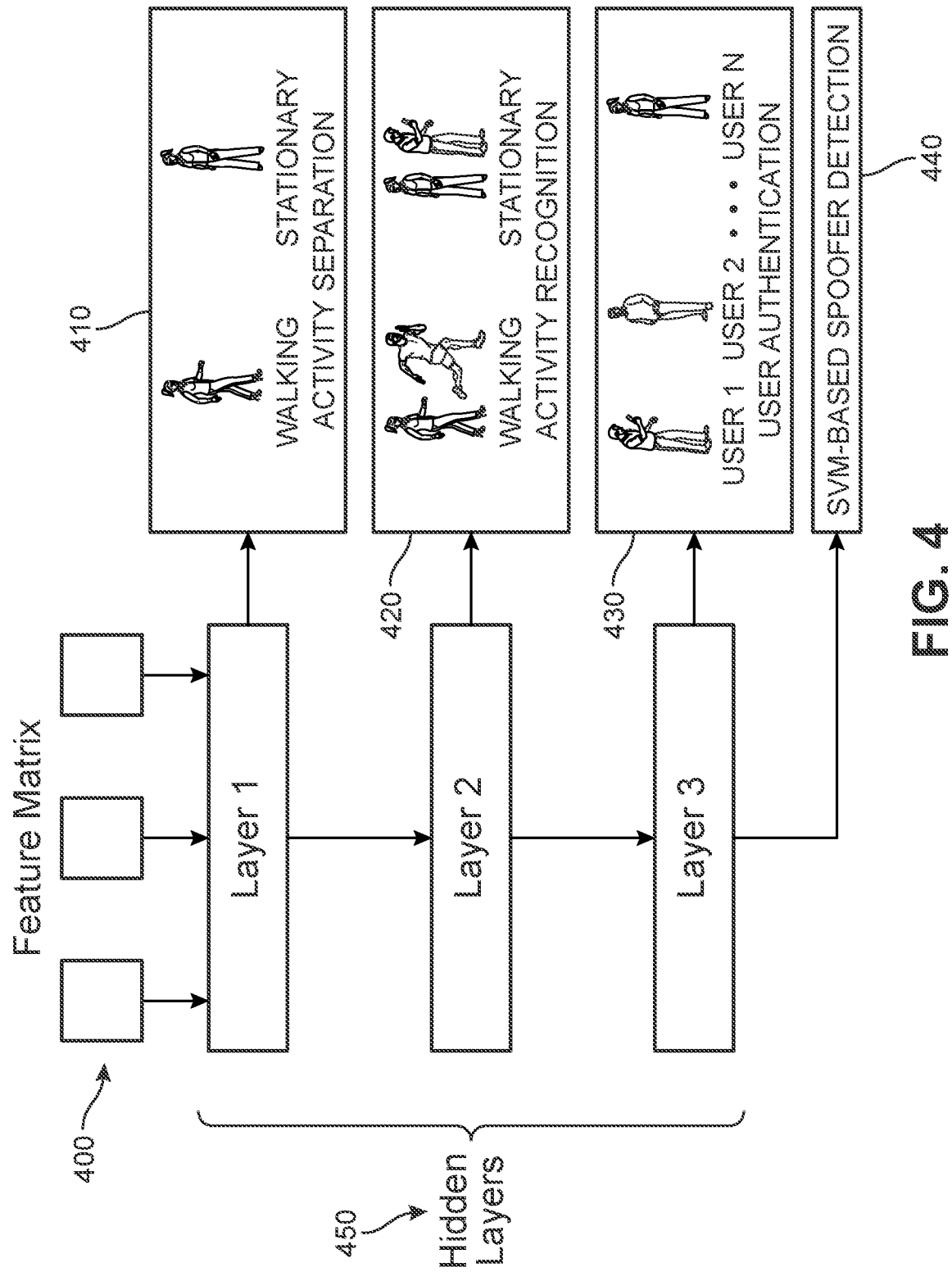
FIG. 4 is a schematic flow diagram depicting a deep learning architecture for touchless user authentication, according to an embodiment.

In different embodiments, the CSI data that will be collected during subsequent authentication sessions are processed in a similar manner to extract the same set(s) of features which can then be matched with the feature sets stored in the database during the training session. In FIG. 4, one example of a possible process by which the feature sets collected during training session(s) and subsequent authentication sessions can be processed and classified is presented simply for purposes of illustration. In some embodiments, the stored feature training sets can be used to train person identification classifiers via a support vector machine (SVM) toolbox.

It can be seen in FIG. 4 that one or more extracted CSI feature matrices 400 can be passed through a deep neural network (DNN) to extract high level abstractions. In the specific example of FIG. 4, a three-layer stacked autoencoder 450 based on a deep neural network model is used to classify the features into a set of compressed representations, which is then fed into classification functions (e.g., SVM or softmax function) in each layer. For example, in one embodiment, a DNN network can be configured to coarsely recognize the activity type (e.g., stationary or walking) in a first layer 410 and obtains the activity details (e.g., specific type of activities) in a second layer 420. The outputs (e.g., high-level, complex abstractions as data representations) from the first two layers are conveyed to a third layer 430 that can be used to identify each individual user, for example with a softmax function. Additionally, in some embodiments, an SVM model with DNN abstractions can integrated to ensure that the subsequent authentications are spoofing attack resilient (spoofer detection 440). In some embodiments, the SVM model can also be used to determine whether the activity the user performed matches one of the legitimate user profiles (i.e., whether the currently collected data matches a training-generated feature record stored in association with a user account).

Figure 5:
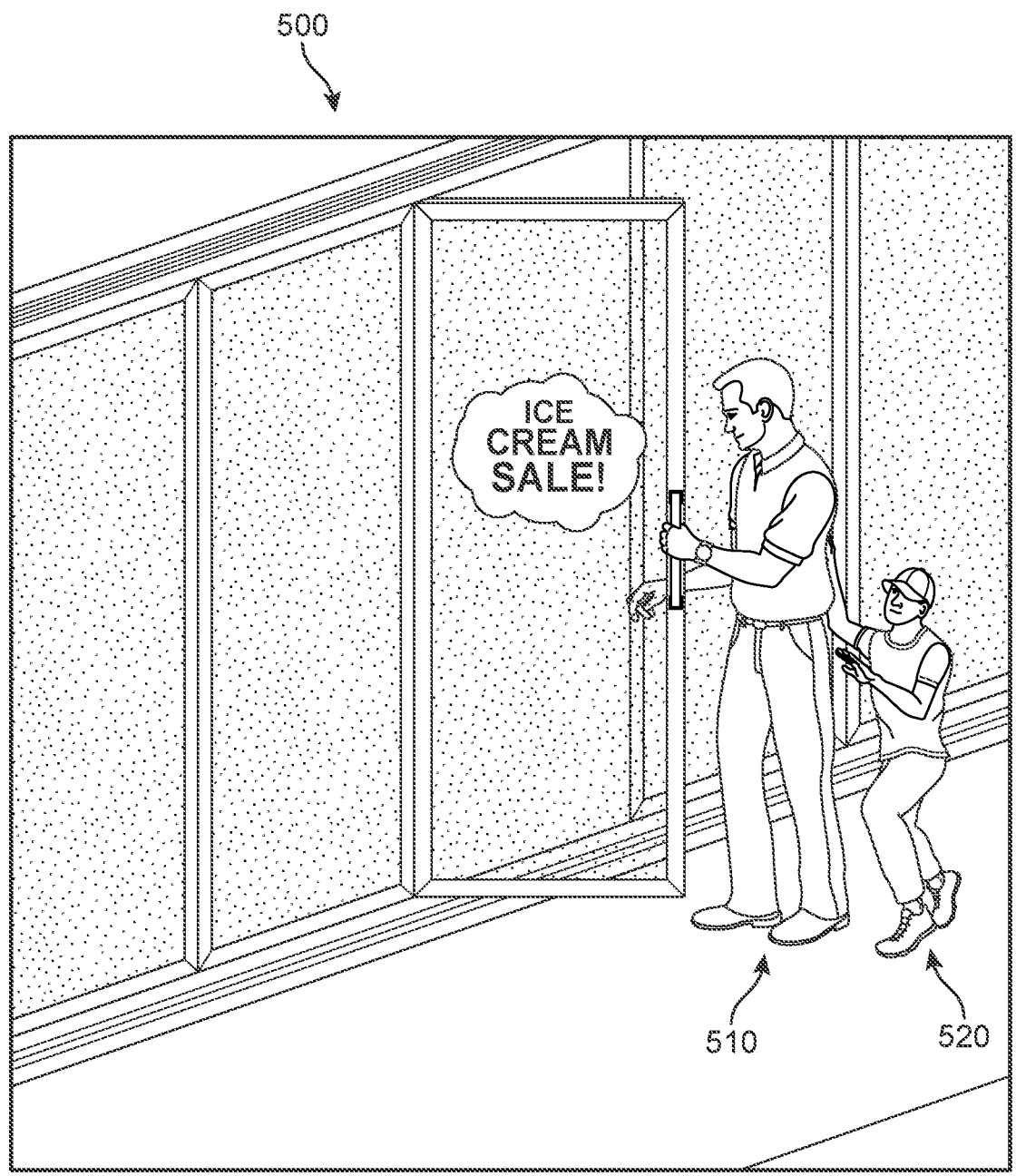
FIG. 5 is an illustration of a person engaged in a retail shopping experience with their child, according to an embodiment.
Figure 6:
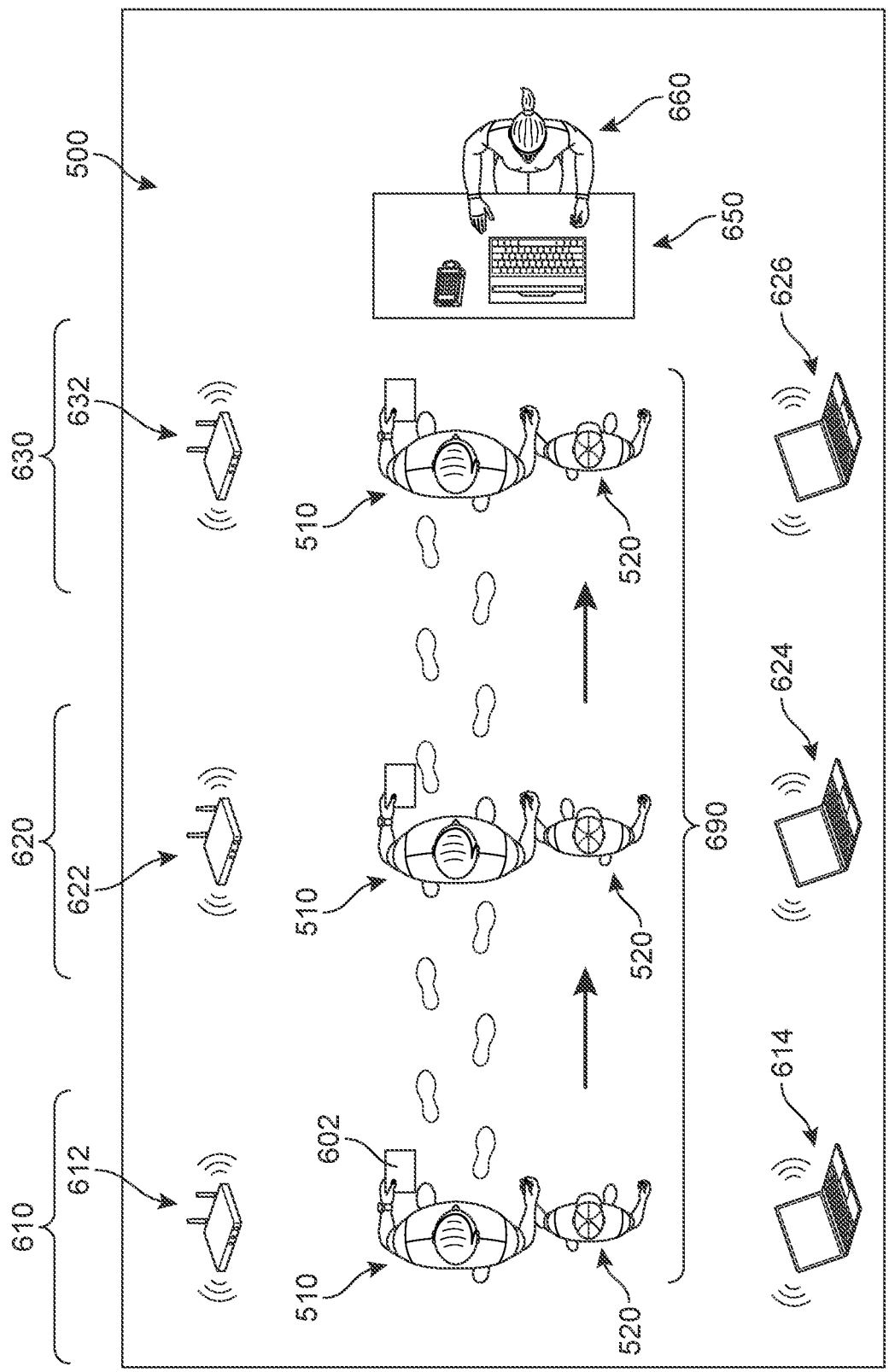
FIG. 6 is a top-down view of the person of FIG. 5 passing through an authentication sensor zone, according to an embodiment.

For purposes of illustration, an example of a scenario in which an embodiment of the proposed systems may be implemented is shown with reference to FIGS. 5-10. In FIG. 5, a retail environment ("store") 500 is shown in which a customer 510 and his child 520 are browsing. In this case, the customer 510 is reaching for a selection of ice cream being made available for purchase in the store 500. It is important to note that customer 510 does not hold or carry any identification tokens, and in this case does not have a wallet or other payment token. In other words, customer 510 is hands-free, enjoying the freedom to focus only on the care of his child while he moves through the shopping aisles. In FIG. 6, a time-lapse view of a path 690 leading to a checkout station 650 of the store 500 is provided. The customer 510 is depicted moving through several authentication checkpoints that have been arranged along path 690, including a first checkpoint 610 comprising a first pair of Wi-Fi enabled devices (a transmitter device 612 and a receiver device 614), a second checkpoint 620 comprising a second pair of Wi-Fi enabled devices (a transmitter device 622 and a receiver device 624), and a third checkpoint 630 comprising a third pair of Wi-Fi enabled devices (a transmitter device 612 and a receiver device 614). It should be understood that while a plurality of authentication checkpoints is shown, this is for purposes of security redundancy only, and only one pair is actually required to perform the authentication.

It can further be understood that customer 510 had previously participated in a training data collection session with the goal of enrolling or registering himself in this particular authentication technique, and that the biometric signal that was generated at that time was stored in a record in a database accessible by the depicted authentication system. The customer 510 may have participated in the training session while he was alone, as well as while he was with his child 520. In other words, there may be more than one biometric signal stored and linked to the customer's account. In other cases, the customer's CSI data may be collected while the customer pushes a shopping cart or holds or is in contact with other commonly carried items, merchandise, or bags, infants, children, partner, pets, mobile devices, and other objects in order to better mimic later authentication events.

In addition, in different embodiments, the customer 510 may opt to provide training data updates at different intervals. For example, the customer 510 may gain or lose weight, undergo surgery, or experience some other physical change that may affect the CSI data, and therefore wish to submit new training data. In other cases, the merchant or other authentication entity may require or recommend that participants provide new training data twice a year, once a month, or at other less or more frequent intervals to ensure the biometric signal stored is up-to-date. In one embodiment, the biometric signal can be associated with an expiration date or period of time after which the participant will be required to provide a new (updated) biometric signal. In some embodiments, an account for the customer verifying their identification credentials can also be linked to the customer's biometric signal at or around that time. Thus, a verification process may occur in conjunction with the collection of the initial CSI data, whereby the participant presents identity documents that can be used to confirm the user's identity. The user identity can then be linked to the biometric signal in the record. In some embodiments, the biometric signal and/or account can be further linked to the customer's credit and/or payment details that can facilitate or even automate the retail merchandise transaction process. In addition, in some embodiments, the record or user account may identify an authorization type or level that the customer is to be granted. For example, the customer may be authorized to make purchases up to a certain amount, purchases that include or exclude specific items or categories of items, a maximum number or value of items per a particular window of time or per transaction, to access restricted areas of the store, or other such authorization boundaries may be linked to the account.

Figure 7:
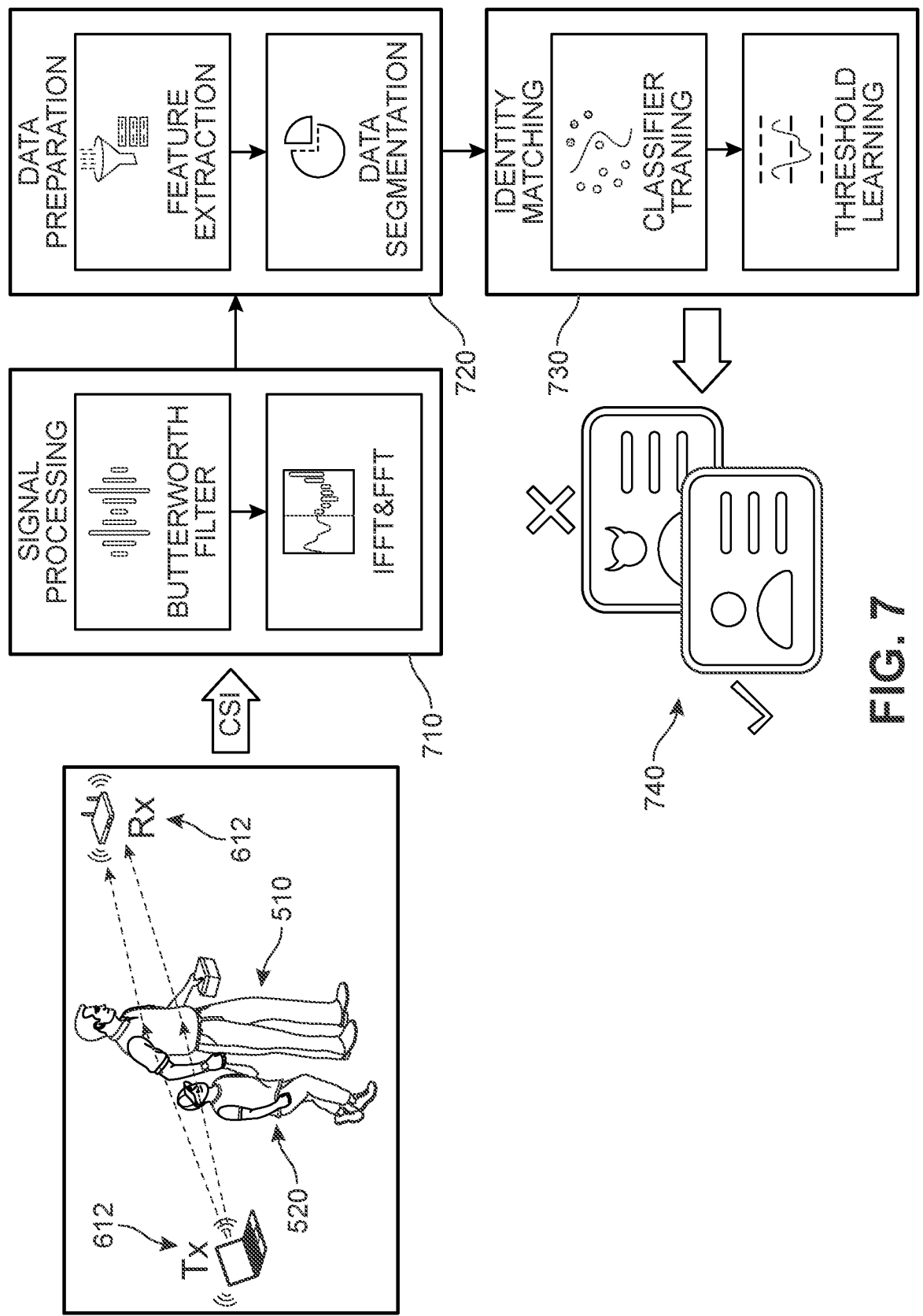
FIG. 7 is a schematic flow diagram depicting the collection of signal data being processed and used to verify an identity of the person shown in FIG. 6, according to an embodiment.

Thus, as the customer 510 moves toward checkout 650 (and toward an optional employee 660) of the store 500 with his desired item 602 (e.g., container of ice cream), he passes through each of these checkpoints. In FIG. 7, a schematic flow diagram illustrates an example of some of the operations that can be performed by the authentication system during or around this time. It should be understood that in different embodiments, one or more of these operations may be omitted, and/or additional or different operations may be performed, or the order of these operations may vary. As customer 510 (and in this case, child 520) are physically passing through the sensor zone established by a pair of Wi-Fi-enabled devices (for purposes of reference, transmitter device 612 and receiver device 614), CSI data 702 is collected. In this case, the system may recognize that the customer 510 is not alone and is walking with child 520, and search for a record with a biometric signal in which the customer is identified as having a dependent child present with them. As shown in FIG. 7, the CSI data 702 can initially be processed at a first stage 710 ("signal processing"), for example by application of a low-pass Butterworth filter and/or IFT and FFT, to better eliminate noise in the signal and mitigate signals received from other paths (thereby increasing the likelihood that the signal is more representative of the person's body rather than other signal artifacts). In different embodiments, the system may incorporate omni-directional antennas to broadcast and receive Wi-Fi signals, which makes CSI the mixture of signals from multiple propagation paths, including the line-of-sight path, the paths reflected from human body, and other reflection paths, and so the signal processing stage can improve signal quality and accuracy significantly.

At a second stage 720 ("data preparation") the output of first stage 710 is further processed for purposes of feature extraction and optional data segmentation and this information is used for identity matching in a third stage 730. In some embodiments, classifier training (trained using the training session feature sets) can be applied to detect a match 740 from the database. In some embodiments, threshold learning may also be applied to ensure that matches are only found if the normalized prediction score is above a specified threshold, thereby reducing the vulnerability of the system to unauthorized users (users for whom CSI data has not been previously collected). In other words, if the likelihood is below a particular threshold, the system may reject the user and/or refuse or fail to authenticate the user.

Figure 8:
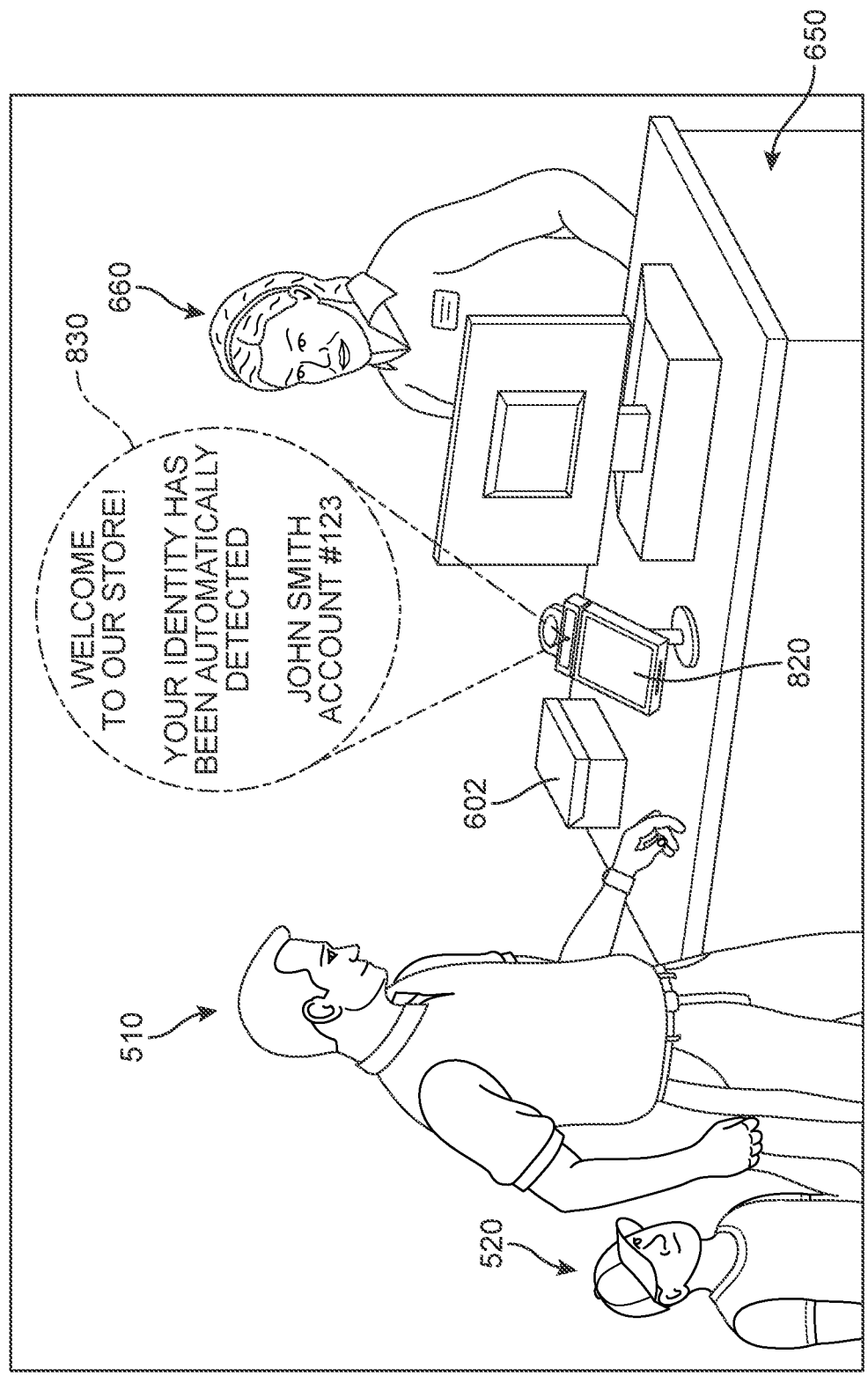
FIG. 8 is an illustration of the person of FIG. 7 as he is being identified as a trusted user, according to an embodiment.
Figure 9:
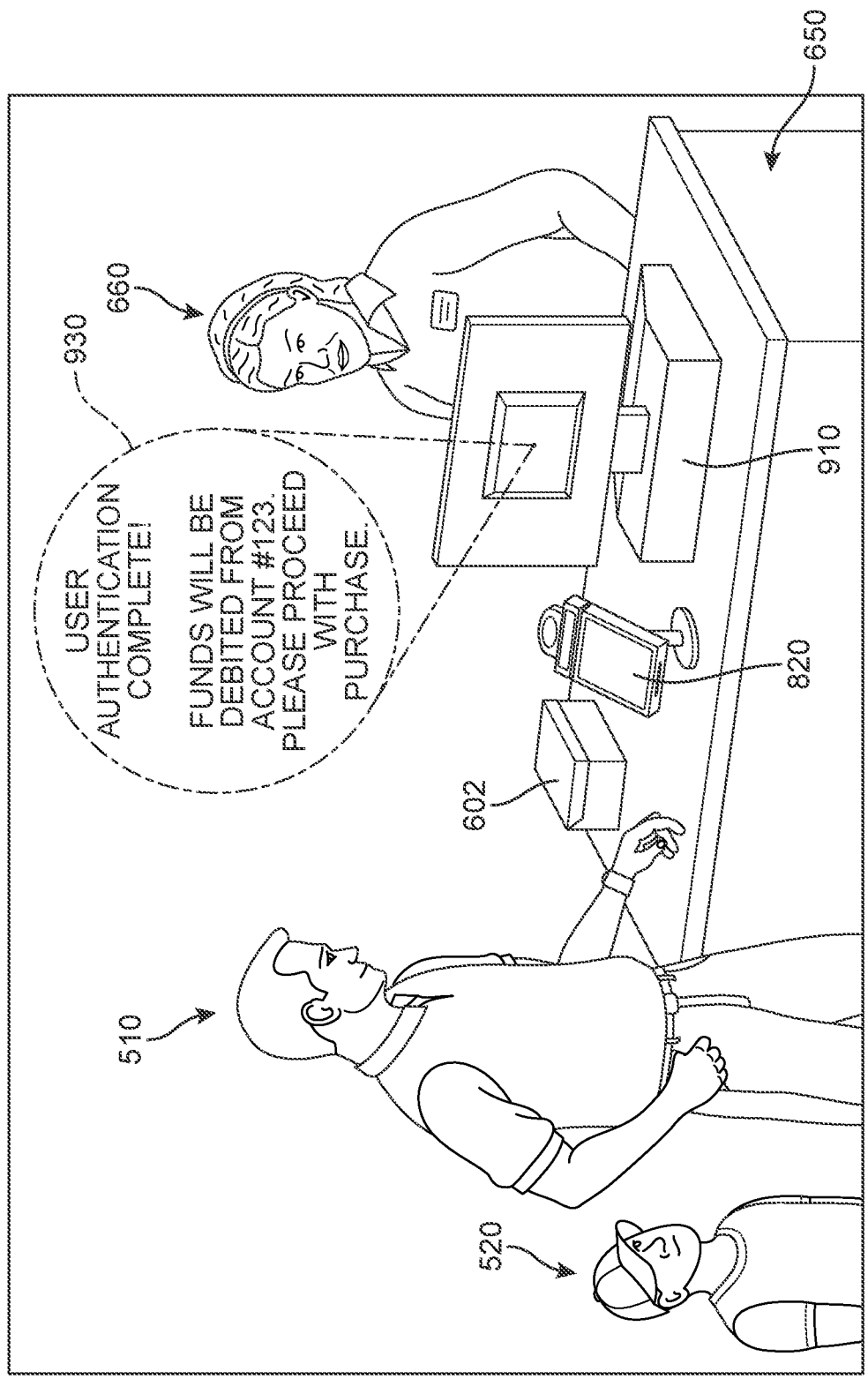
FIG. 9 is an illustration of the person of FIG. 8 being successfully authenticated and authorized for a retail transaction, according to an embodiment.
Figure 10:
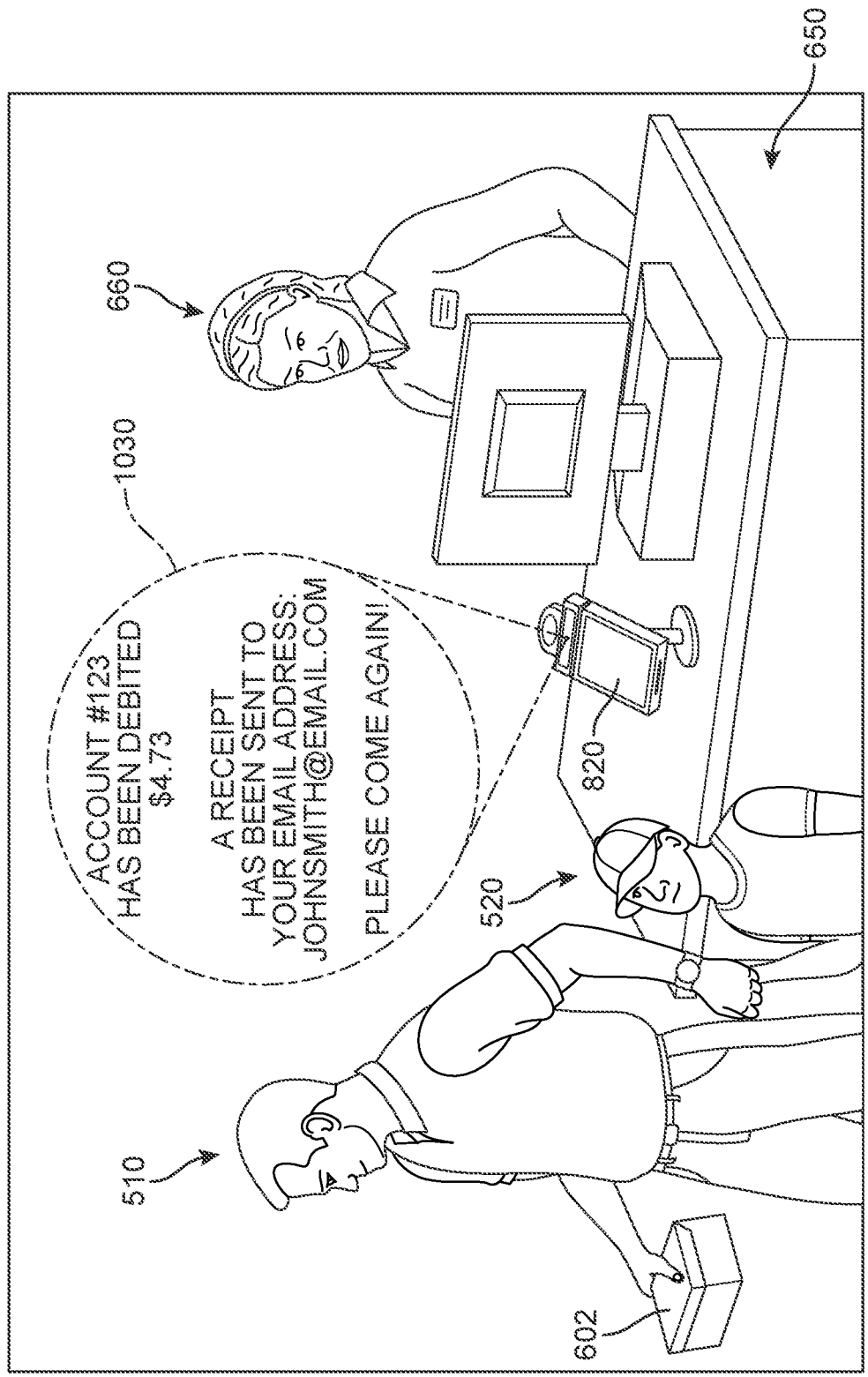
FIG. 10 is an illustration of the person of FIG. 9 completing a purchase based on his authenticated identity, according to an embodiment.

FIGS. 8-10 present a sequence in which the customer 510 experiences an efficient, touchless checkout process. In FIG. 8, the customer 510 and child 520 approach the counter of the checkout station 650. The customer 510 places the item 602 on the counter while easily retaining the hand of his child 520 and being untroubled by the need to locate, remove, or present any identification card or token. Instead, the customer 510 simply receives an indication that confirms or otherwise informs him as to his authentication status. For example, in FIG. 8, a welcome message 830 ("Welcome to our store! Your identity has been automatically detected. JOHN SMITH, ACCOUNT #123) via a display 820. In other embodiments, the customer may be presented with a change in a light display (e.g., red to green, or some other light color, intensity, or pattern change), a tone or beep indicating he has been authenticated, or some other means by which he may be assured that the process has correctly determined his or her identity (or has failed to do so). In some embodiments, no notification may be provided unless the system is unable to locate a matching record for the customer, so that the customer can assume his identity has been appropriately determined and verified unless otherwise alerted.

In some embodiments, the item 602 can be scanned by the customer 510 (e.g., via a self-service register made available to the customers), or by employee 660. In another embodiment, not shown here, the item(s) may be automatically identified and added to the customer's debit account once the customer is detected as walking out of the store with the item(s). In some embodiments, as shown in FIG. 9, a retail checkout computing device 910 can be provided for use by employee 660 to assist the employee 660 during the transaction and notify the employee 660 if there are any issues or flags associated with the customer's account and/or authorization conditions or restrictions. For example, in some embodiments, the system may require that some or all customers present additional authentication factors, such as a fingerprint, pin code, password, or other factor in some cases, such as where the user is purchasing an item of a particular type or value.

In this case, a notice 930 ("User authentication complete! Funds will be debited from Account #123. Please proceed with purchase.") confirms the authentication process was successful as well as the fact that, at least for purposes of this example, the customer need not present or input any form of payment. Instead, the payment information linked to the authentication record will be automatically accessed and used to finalize the transaction and purchase. In FIG. 10, the display 820 now presents a confirmation message 1030 ("Account #123 has been debited $4.73. A receipt has been sent to your email address: JohnSmith@email.com. Please come again!"). The customer 510 retrieves the item 602 and walks away with child 520 without further interaction with the system, confident that the purchase was completed in the absence of any identification credentials, documents, or physical tokens. In other words, because the user's payment account was also linked to the customer identity, the customer's purchase was automatically completed using a preferred saved payment method, enabling the customer to remain entirely hands-free during the transaction (except for the purchased items and child).

Figure 11:
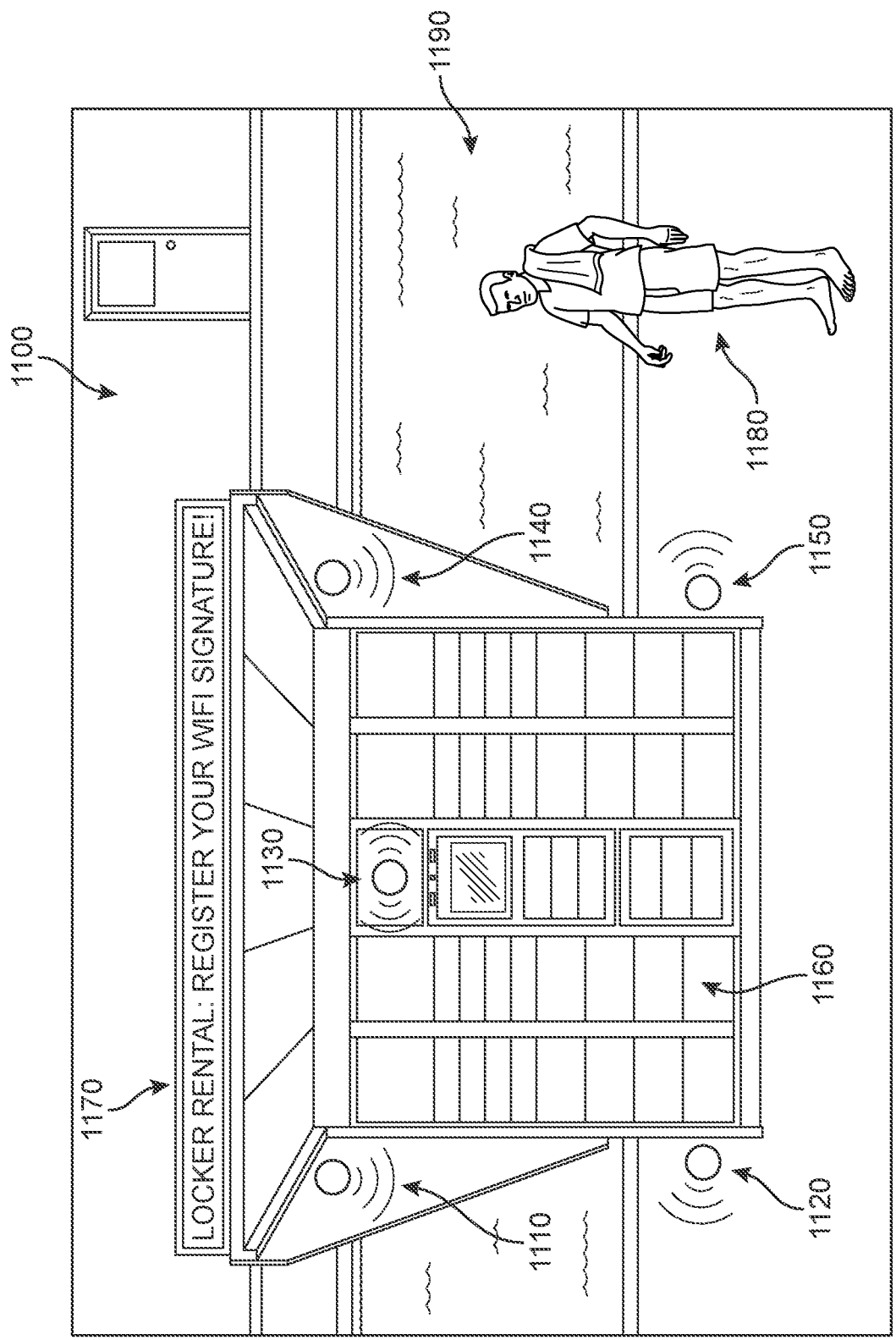
FIG. 11 is an example of an end-user accessing a secure locker service via a touchless authentication system, according to an embodiment.

For purposes of clarity, an alternative embodiment is presented with reference to FIG. 11. In FIG. 11, a patron 1180 of a swimming facility ("facility") 1100. The facility 1100 represents an example of a location such as a beach, amusement park, tourist site, or other space that is typically frequented by persons who strongly desire or prefer to limit the presence of valuables (including identification cards or tokens and money), bags, or other items in their direct custody (i.e., on their person). In this case, patron 1180 will not be able to go swimming in pool 1190 with his wallet, mobile device, or other items and has elected to store such items in a secured locker. Such a service is provided by the facility 1100 through a locker rental station ("station") 1170. Typically, such services require a physical key that must be kept in the consumer's possession, the memorization of a passcode, presentation of an ID, and/or other active interaction with the service that can diminish the consumer's enjoyment of the facility 1100 and cost more time of the patron. However, in FIG. 11, the patron 1180 has emerged from pool 1190 and casually approaches the station 1170 without any key or the burdens of recalling a passcode or other information. Several sets of receiver devices and transmitter devices (illustrated as Wi-Fi enabled nodes 1110, 1120, 1130, 1140, and 1150) are arranged on and around the station 1170 and are generating an RF field. The resultant rather large sensor zone can detect the patron's approach and authenticate his identity without further interaction with the station. Thus, the patron 1180 is able to walk directly to his locker 1160 and find it unlocked in response to the collection of CSI data associated with his approach. It can be understood that prior to being assigned or selected a locker from the service at this time, the patron 1180 provided the training data necessary to identify him. The original or initial biometric signal that was generated may have been obtained in response to the patron 1180 requesting the use of locker 1160 (e.g., the system may direct the patron to walk around the station 1170 in a particular direction or along a specific path) or can have been obtained at an earlier time in cases where the patron 1180 is a regular visitor of facility 1100.

Figure 12:
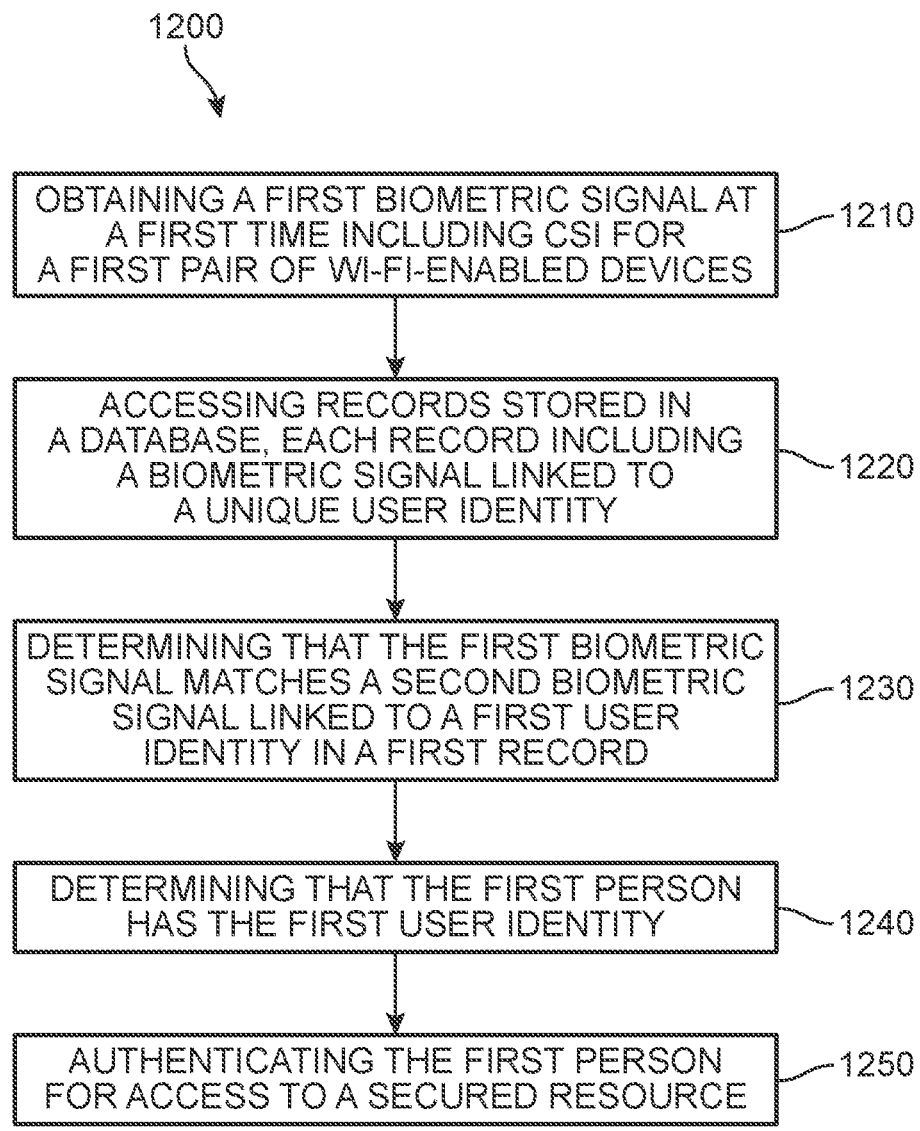
FIG. 12 is a flow chart depicting a process of authenticating a user using Wi-Fi signals, according to an embodiment.

FIG. 12 is a flow chart illustrating an embodiment of a method 1200 of authenticating an identity of an individual. The method 1200 includes a first step 1210 of obtaining a first biometric signal at a first time, the first biometric signal including channel state information (CSI) for a first pair of Wi-Fi-enabled devices while a first person was physically in a sensor range of the first pair of Wi-Fi-enabled devices. The method also includes a second step 1220 of accessing a plurality of records stored in a database, where each record of the plurality of records includes a biometric signal linked to a unique user identity, as well as a third step 1230 of determining that the first biometric signal matches a second biometric signal of a first record of the plurality of records, the second biometric signal being linked to a first user identity. The method further includes a fourth step 1240 of determining, in response to the first biometric signal matching the second biometric signal, that the first person has the first user identity, and a fifth step 1250 of authenticating the first person for access to a secured resource.

In other embodiments, the method may include additional steps or aspects. In some embodiments, the method also includes obtaining the second biometric signal at a second time earlier than the first time, the second biometric signal including CSI generated between the first pair of Wi-Fi-enabled devices while the first person was physically in the sensor range of the first pair of Wi-Fi-enabled devices. In another example, the method further includes employing, prior to the first time, a verification process to verify that the first person is associated with the first user identity, generating the first record that links the second biometric signal to the first user identity, and storing the first record in the database. In one embodiment, the method can also include capturing the second biometric signal when the first person moves along a first path extending through at least a portion of the sensor range of the first pair of Wi-Fi-enabled devices, and capturing the first biometric signal when the first person moves along the first path. In another embodiment, the method includes capturing the second biometric signal when the first person is walking in a first direction between the first pair of Wi-Fi-enabled devices, and capturing the first biometric signal when the first person is walking in a second direction, substantially opposite to the first direction, between the first pair of Wi-Fi-enabled devices. In one example, the secured resource includes one of a service, feature, and physical space for which access is restricted to one or more authorized persons.

In different embodiments, the method may further include obtaining a third biometric signal at a third time, the third biometric signal including CSI for the first pair of Wi-Fi-enabled devices while a second person was physically in the sensor range of the first pair of Wi-Fi-enabled devices, determining that a likelihood of the third biometric signal matching a biometric signal available in the plurality of records is below a first threshold, and rejecting the first person from accessing the secured resource. In another example, the method also includes obtaining a third biometric signal at a third time prior to the first time. In such cases, the third biometric signal includes CSI for the first pair of Wi-Fi-enabled devices while the first person was physically in the sensor range of the first pair of Wi-Fi-enabled devices and in contact with a shopping cart, second person, or merchandise. The method can also then include linking both the first biometric signal and the third biometric signal to the first user identity in the first record.

In some embodiments, the method further includes adding, prior to the first time, an authorization to the first record permitting access to a payment account linked to the first user identity, receiving, from the first person, a request for purchase of a first item, and automatically debiting the payment account an amount corresponding to a sale price of the first item. In another example, the method also includes detecting, at a third time, an expiration of a validity of the second biometric signal, obtaining a third biometric signal after the third time, the third biometric signal including CSI for the first pair of Wi-Fi-enabled devices while the first person was physically in the sensor range of the first pair of Wi-Fi-enabled devices, and replacing the second biometric signal with the third biometric signal in the first record.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of authenticating an identity of an individual, the method comprising:
   obtaining a first biometric signal at a first time, the first biometric signal including channel state information for a first pair of Wi-Fi-enabled devices while a first person was physically in a sensor range of the first pair of Wi-Fi-enabled devices;
   wherein the first pair of Wi-Fi-enabled devices broadcast and receive Wi-Fi signals using omnidirectional antennas to make the channel state information a mixture of signals from multiple propagation paths, thereby improving signal quality and accuracy;
   accessing a plurality of records stored in a database, wherein each record of the plurality of records includes a biometric signal linked to a unique user identity;
   determining that the first biometric signal matches a second biometric signal of a first record of the plurality of records, the second biometric signal being linked to a first user identity;
   determining, in response to the first biometric signal matching the second biometric signal, that the first person has the first user identity; and
   authenticating the first person for access to a secured resource.

2. The method of claim 1, further comprising:
   notifying the first person of an authentication status;
   adding, prior to the first time, an authorization to the first record permitting access to a payment account linked to the first user identity;
   receiving, from the first person, a request for purchase of a first item;
   automatically identifying the first item and a sale price of the first item;
   automatically debiting the payment account an amount corresponding to the sale price of the first item; and
   providing a visual confirmation to the first person notifying the first person that the purchase is complete;
   wherein the visual confirmation includes the identity of the first item and the sale price of the first item.

3. The method of claim 1, further comprising obtaining the second biometric signal at a second time earlier than the first time, the second biometric signal including channel state information generated between the first pair of Wi-Fi-enabled devices while the first person was physically in the sensor range of the first pair of Wi-Fi-enabled devices.

4. The method of claim 3, further comprising:
   employing, prior to the first time, a verification process to verify that the first person is associated with the first user identity;
   generating the first record that links the second biometric signal to the first user identity; and
   storing the first record in the database.

5. The method of claim 1, further comprising:
   capturing the second biometric signal when the first person moves along a first path extending through at least a portion of the sensor range of the first pair of Wi-Fi-enabled devices; and
   capturing the first biometric signal when the first person moves along the first path.

6. The method of claim 1, further comprising:
   capturing the second biometric signal when the first person is walking in a first direction between the first pair of Wi-Fi-enabled devices; and
   capturing the first biometric signal when the first person is walking in a second direction, substantially opposite to the first direction, between the first pair of Wi-Fi-enabled devices.

7. The method of claim 1, wherein the first biometric signal is processed using at least one of a low-pass Butterworth filter, an Indirect Fourier Transform, and a Fast Fourier Transform to eliminate noise and mitigate signals from other paths.

8. The method of claim 1, wherein the channel state information includes channel state information feature matrices and the channel state information feature matrices are passed through layers of a deep neural network to recognize an activity type, activity details, and an individual user identity, wherein the individual user identity is determined using a softmax function and wherein a support vector machine model determines whether the individual user identity matches a legitimate user profile, thereby preventing spoofing.

9. A system for authenticating an identity of an individual, the system comprising at least one processor configured to:
   obtain a first biometric signal at a first time, the first biometric signal including channel state information for a first pair of Wi-Fi-enabled devices while a first person was physically in a sensor range of the first pair of Wi-Fi-enabled devices;
   wherein the first pair of Wi-Fi-enabled devices broadcast and receive Wi-Fi signals using omnidirectional antennas to make the channel state information a mixture of signals from multiple propagation paths, thereby improving signal quality and accuracy;
   access a plurality of records stored in a database, wherein each record of the plurality of records includes a biometric signal linked to a unique user identity; determine that the first biometric signal matches a second biometric signal of a first record of the plurality of records, the second biometric signal being linked to a first user identity;
   determine, in response to the first biometric signal matching the second biometric signal, that the first person has the first user identity;
   authenticate the first person for access to a secured resource;
   add, prior to the first time, an authorization to the first record permitting access to a payment account linked to the first user identity;
   receive, from the first person, a request for purchase of a first item; and
   automatically debit the payment account an amount corresponding to a sale price of the first item.

10. The system of claim 9, wherein the at least one processor is further configured to:
    obtain a third biometric signal at a third time, the third biometric signal including channel state information for the first pair of Wi-Fi-enabled devices while a second person was physically in the sensor range of the first pair of Wi-Fi-enabled devices;
    determine that a likelihood of the third biometric signal matching a biometric signal available in the plurality of records is below a first threshold; and
    reject the first person from accessing the secured resource.

11. The system of claim 9, wherein the at least one processor is further configured to obtain the second biometric signal at a second time earlier than the first time, the second biometric signal including channel state information generated between the first pair of Wi-Fi-enabled devices while the first person was physically in the sensor range of the first pair of Wi-Fi-enabled devices.

12. The system of claim 11, wherein the at least one processor is further configured to:
   employ, prior to the first time, a verification process to verify that the first person is associated with the first user identity;
   generate the first record that links the second biometric signal to the first user identity; and
   store the first record in the database.

13. The system of claim 12, wherein the at least one processor is further configured to:
   obtain a third biometric signal at a third time prior to the first time, the third biometric signal including channel state information for the first pair of Wi-Fi-enabled devices while the first person was physically in the sensor range of the first pair of Wi-Fi-enabled devices and in contact with at least one of a shopping cart, second person, and merchandise; and
   link both the first biometric signal and the third biometric signal to the first user identity in the first record.

14. The system of claim 12, wherein the at least one processor is further configured to:
   detect, at a third time, an expiration of a validity of the second biometric signal; obtain a third biometric signal after the third time, the third biometric signal including channel state information for the first pair of Wi-Fi-enabled devices while the first person was physically in the sensor range of the first pair of Wi-Fi-enabled devices; and
   replace the second biometric signal with the third biometric signal in the first record.

15. The system of claim 12, wherein the at least one processor is further configured to:
   capture the second biometric signal when the first person is walking in a first direction between the first pair of Wi-Fi-enabled devices; and
   capture the first biometric signal when the first person is walking in a second direction, substantially opposite to the first direction, between the first pair of Wi-Fi-enabled devices.

16. The system of claim 12, wherein the at least one processor is further configured to:
   notify the first person of an authentication status;
   automatically identify the first item and the sale price of the first item; and
   provide a visual confirmation to the first person notifying the first person that the purchase is complete;
   wherein the visual confirmation includes the identity of the first item and the sale price of the first item.

17. A system for authenticating an identity of an individual, the system comprising at least one processor configured to:
   obtain a first biometric signal at a first time, the first biometric signal including channel state information for a first pair of Wi-Fi-enabled devices while a first person was physically in a sensor range of the first pair of Wi-Fi-enabled devices;
   wherein the first biometric signal is processed using at least one of a low-pass Butterworth filter, an Indirect Fourier Transform, and a Fast Fourier Transform to eliminate noise and mitigate signals from other paths;
   wherein the first pair of Wi-Fi-enabled devices broadcast and receive Wi-Fi signals using omnidirectional antennas to make the channel state information a mixture of signals from multiple propagation paths, thereby improving signal quality and accuracy;
   access a plurality of records stored in a database, wherein each record of the plurality of records includes a biometric signal linked to a unique user identity;
   determine that the first biometric signal matches a second biometric signal of a first record of the plurality of records, the second biometric signal being linked to a first user identity;
   determine, in response to the first biometric signal matching the second biometric signal, that the first person has the first user identity; and
   authenticate the first person for access to a secured resource.

18. The system of claim 17, wherein the second biometric signal is obtained at a second time earlier than the first time, the second biometric signal including channel state information generated between the first pair of Wi-Fi-enabled devices while the first person was physically in the sensor range of the first pair of Wi-Fi-enabled devices.

19. The system of claim 17, wherein the at least one processor is further configured to:
   notify the first person of an authentication status;
   add, prior to the first time, an authorization to the first record permitting access to a payment account linked to the first user identity;
   receive, from the first person, a request for purchase of a first item;
   automatically identify the first item and a sale price of the first item;
   automatically debit the payment account an amount corresponding to the sale price of the first item; and
   provide a visual confirmation to the first person notifying the first person that the purchase is complete;
   wherein the visual confirmation includes the identity of the first item and the sale price of the first item.

20. The system of claim 17, wherein the at least one processor is further configured to:
   detect, at a third time, an expiration of a validity of the second biometric signal;
   obtain a third biometric signal after the third time, the third biometric signal including channel state information for the first pair of Wi-Fi-enabled devices while the first person was physically in the sensor range of the first pair of Wi-Fi-enabled devices; and
   replace the second biometric signal with the third biometric signal in the first record.

* * * * *